United States Patent
Buchhold

(10) Patent No.: US 7,377,374 B2
(45) Date of Patent: May 27, 2008

(54) METHOD FOR DETERMINING A POINT OF APPLICATION OF THE CLUTCH FOR AN AUTOMATIC GEARBOX

(75) Inventor: Oliver Buchhold, Deggenhausertal (DE)

(73) Assignee: ZF Friedrichshafen AG, Friedrichshafen (DE)

(*) Notice: Subject to any disclaimer, the term of this patent is extended or adjusted under 35 U.S.C. 154(b) by 289 days.

(21) Appl. No.: 10/545,958

(22) PCT Filed: Jan. 31, 2004

(86) PCT No.: PCT/EP2004/000864

§ 371 (c)(1),
(2), (4) Date: Aug. 15, 2005

(87) PCT Pub. No.: WO2004/074025

PCT Pub. Date: Sep. 2, 2004

(65) Prior Publication Data

US 2006/0166788 A1    Jul. 27, 2006

(30) Foreign Application Priority Data

Feb. 19, 2003    (DE) .............................. 103 06 934

(51) Int. Cl.
B60W 10/02    (2006.01)
B60W 10/10    (2006.01)
F16D 48/06    (2006.01)

(52) U.S. Cl. .................. 192/3.55; 192/3.63; 192/30 W
(58) Field of Classification Search .............. 192/69.83
See application file for complete search history.

(56) References Cited

U.S. PATENT DOCUMENTS

| 5,993,352 A | 11/1999 | Kosik et al. |
| 6,769,523 B2 * | 8/2004 | Muetzel et al. ............ 192/3.55 |
| 2002/0038747 A1 | 4/2002 | Huschka et al. |
| 2002/0137596 A1 | 9/2002 | Markyvech |
| 2003/0148852 A1 | 8/2003 | Amendt et al. |

FOREIGN PATENT DOCUMENTS

| DE | 100 34 744 A1 | 3/2001 |
| EP | 0512727 A2 * | 11/1992 |

* cited by examiner

Primary Examiner—Richard M Lorence
(74) Attorney, Agent, or Firm—Davis Bujold & Daniels, P.L.L.C.

(57) ABSTRACT

The invention relates to a method for determining a point of application of the clutch of an automatic gearbox without a synchronised reverse action. The aim of said invention is to improve the determination of the point of application avoiding the use of sensorial information on an engine. For this purpose, the point of application is determined as each point of the clutch releasing where a torque transmitted by the gearbox is sufficiently important for releasing the teeth (3) of a sliding sleeve (1) in a tooth-to-tooth position against the teeth (4) of the clutch body (2) of the reverse gear toothed wheel.

16 Claims, 2 Drawing Sheets

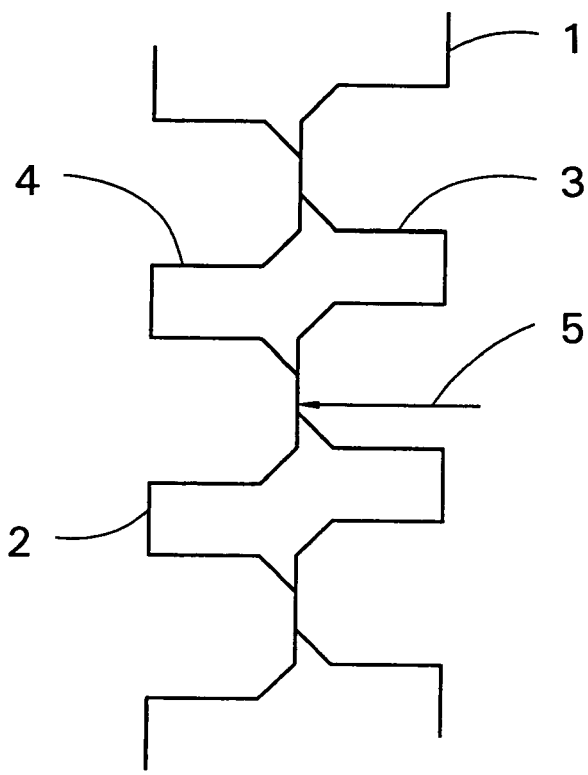
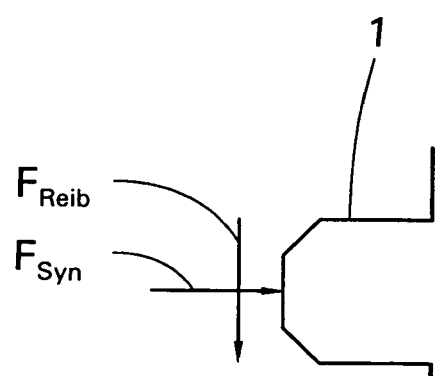
Fig. 1                  Fig. 2
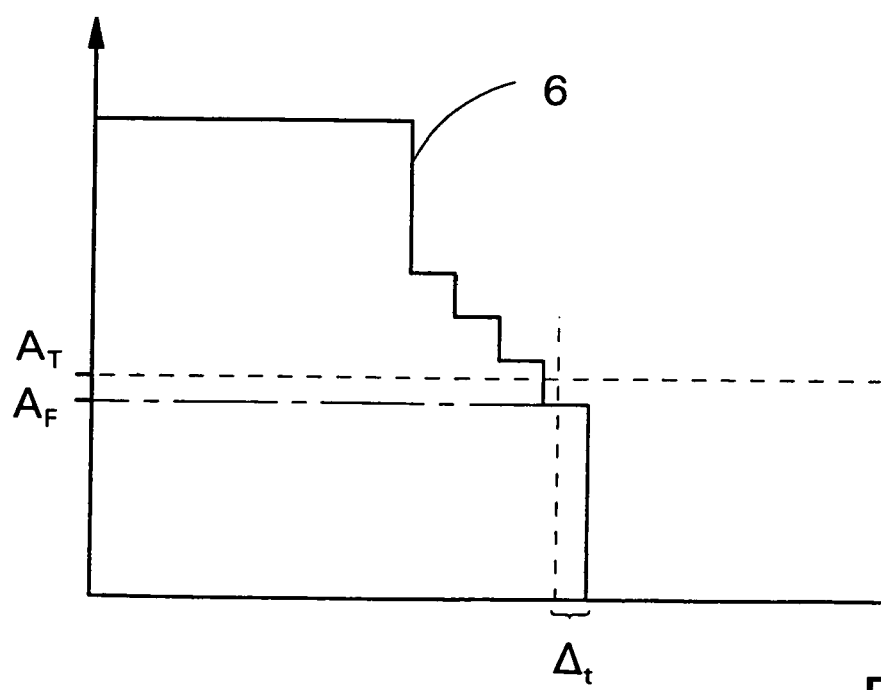
Fig. 3

METHOD FOR DETERMINING A POINT OF APPLICATION OF THE CLUTCH FOR AN AUTOMATIC GEARBOX

This application is a national stage completion of PCT/EP2004/000864 filed Jan. 31, 2004 which claims priority from German Application Serial No. 103 06 934.8 filed Feb. 19, 2003.

FIELD OF THE INVENTION

The invention concerns a method for determining a contact point of the clutch for an automated transmission with a non-synchronized reverse.

BACKGROUND OF THE INVENTION

The method of the invention is accordingly usable in automated transmissions in connection with automated clutch and transmission functions which are used in motor vehicles. Such an automated transmission comprises activation devices for the selection of transmission selection pathways and of transmission shift pathways with which a shifting or selecting lever activation can be converted into corresponding shifting or selection processes in reference to the transmission.

Moreover, an additional activation device for a shifting and starting clutch connected through drive engineering with the transmission is provided, which is placed into operation with gearshifting processes for opening and closing the clutch. The activation devices mentioned are constructed such that these can be activated hydraulically, pneumatically or electrically.

Furthermore, a sensor for determining the clutch position or the clutch adjustment path is arranged on such a clutch or activation device with which the position or the adjustment path of the movable part of the clutch and/or clutch activation device can be ascertained.

Finally, such a transmission comprises an electronic control or regulation apparatus that is usually constructed as a microcomputer and is connected with the sensors and activating equipment mentioned above through sensor and control lines and can preferably perform exchange data with a motor control apparatus.

Above all, automated transmissions offer good shifting comfort, if the control and regulation apparatus knows exactly the clutch position in which the clutch is brought into a closing position such that torque transmission is just setting in.

This clutch position, or a clutch position with a previously established distance from the aforementioned position, is designated as a contact point below. This clutch position can shift in the short or the long term by thermal expansion of the clutch components or by wear and tear of the clutch linings. It is, therefore, necessary to continuously monitor the contact point during operation, especially during the lifetime of the clutch or the motor vehicle and, if need be, to adapt the clutch control in harmony with the changes.

A large number of proposals exist for determining the contact point. In further observations in connection with the present invention, methods in which a transmission input rotational speed sensor is needed will not be considered, since such sensors measuring a drive motor-related variable are to be dispensed with in accordance with the specifications in connection with the invention.

For example, the method described in DE 196 30 014 A1 manages without a transmission input rotational speed sensor of this type. In this known method, the point of contact is determined by applying the clutch when the gear step is shifted and the motor vehicle is standing still while the brake is activated by observing the motor rotational speed. The motor rotational speed is reduced by closing the clutch, resulting in a significant increase in motor torque controlled by an idling rotational speed regulating unit. When the clutch is closed, the position point at which the motor torque exceeds a predefined threshold value of the motor torque, is then recognized as the point of contact and stored in a control apparatus.

Moreover a method is known from WO 01/98679 A1 in which a creep torque is generated by slowly closing the clutch. The motor torque is continuously monitored for this during the creep process. The clutch position point is then determined as the current point of contact at which a significant change in motor torque is observed.

These known methods are based upon sensor signals, which are related to the drive motor of the motor vehicle. These methods are therewith dependent upon the accuracy of these signals which, in practice, leads to unsatisfying results. It is rather desirable if the determination of the contact point can take place with clutch or transmission-related variables.

The object of the invention is, therefore, to ascertain this point without motor-related sensor information for improving the accuracy of determining the contact point of the clutch.

The solution of this objective becomes apparent from the main claim, while advantageous refinements and further developments of the invention can be inferred from the dependent claims.

SUMMARY OF THE INVENTION

For improving the determination of the point of contact as well as for avoiding the use of motor-related sensor information, it is therefore provided, in accordance with the invention, that the point of contact is determined as that point in the clutch closing path at which the torque transmitted from the clutch is large enough to shift the teeth of a sliding sleeve against the teeth of a clutch body of a reverse gear-toothed wheel in a tooth-on-tooth position. The tooth-on-tooth positions usually result during the standstill of the motor vehicle.

Preferably a control method is provided for this in which the clutch is opened in a first procedural step. In a next step, a synchronized forward gear is engaged to the extent that and as long as the input shaft or countershaft of the transmission is braked in its rotational speed to a value of zero or near zero, controlled by a control and regulation device. Then a reverse gear sliding sleeve allocated a reverse gear-toothed wheel is moved axially until the latter lies mechanically on a reverse gear clutch body of the reverse gear-toothed wheel or enters in a toothing connection with it.

It is then tested in the next procedural step by the control and regulation device whether the reverse gear sliding sleeve is meshed with the reverse gear clutch body and therewith the reverse gear is engaged. To the extent that this is the case, the determination of the point of contact cannot be established in this procedural step, so that the process is ended or is restarted after disengaging the reverse gear.

In the case in which the reverse gear is not engaged, but the tips of the teeth of the sliding sleeve lie in a tooth-on-tooth position on the tips of the teeth of the clutch body of the reverse gear-toothed wheel, the closing of the clutch takes place up to a contact point presumed stored in the control and regulation device or measured the last time.

If it then becomes apparent during the subsequently conducted test that the reverse gear sliding sleeve is meshed with the reverse gear clutch body and that the reverse gear is therefore engaged, this contact place or the adjustment travel of the clutch, up to this contact point, is stored in the control and regulation apparatus and kept ready for the subsequent following clutch activation and contact point determination processes.

Insofar as the reverse gear, however, is not yet engaged, further closing of the clutch and testing parallel to this of whether the reverse gear is engaged takes place until the point of contact is found.

This process for determining the contact point is appropriately conducted while the vehicle is standing still and the drive motor is running. Moreover, it is provided in an advantageous refinement of the invention that the closing of the clutch does not continuously take place during this contact point determination, but rather is small steps between which a predetermined time interval lies. Through this incremental adjustment of the clutch, it can be particularly tested in the phase in which the reverse gear sliding sleeve lies on the reverse gear clutch body in the tooth-on-tooth position between two comparatively small adjustment steps of the clutch activation device. In each case, whether the torque just transmitted by the clutch has sufficed to shift the sliding sleeve against the reverse gear clutch body to the extent that their gearings no longer lie one on the other, but rather the reverse gear is engaged. The length of the clutch closing steps is here that variable upon which the accuracy of establishing the point of contact depends.

This process is appropriately conducted when it is communicated to the control and regulating apparatus by the sensors on a transmission selection or transmission shifting device that the transmission is to be shifted into idling or into driving stage N, or if the transmission is already in this idling position. Under such conditions, the clutch can remain open in the activation process leading to the idling position of the transmission in order to conduct the determination of the clutch contact point directly in connection with this, as explained above.

It can be provided in other refinements of method that the contact point determination is conducted during any reverse gearshifting process or in cyclical or acyclic intervals regardless of the execution of a concrete reverse gearshifting process. The time necessary for this is, as a rule, present at the beginning of the reverse travel situation since the driver of a motor vehicle outfitted in this way is, in any case, adjusted to slower and more exact travel and shifting or clutch activation processes in reverse travel.

A regular determination of the point of contact has the advantage that the current point of contact of the clutch is constantly known and the clutch can thus be shifted especially rapidly and comfortably. Moreover, a cyclical point of contact determination takes place preferably at specified time or travel distance intervals, the cycle length of which can, for example, result from experiential clutch wear and tear values.

Finally, it is preferable that the process be broken off immediately if the demand for another gear reduction change process is communicated to the control and regulation apparatus by sensor information. In this way, a shifting process, currently requested by the driver or driving behavior, is not unnecessarily delayed. Furthermore, the process for determining the point of contact can nevertheless operate in the background so that the driver of a vehicle outfitted in such manner does not notice the implementation of the process.

BRIEF DESCRIPTION OF THE DRAWINGS

The invention will now be described, by way of example, with reference to the accompanying drawings in which:

FIG. 1 shows a radial elevation on a reverse gear clutch body as well as on a sliding sleeve in tooth-on-tooth position;

FIG. 2 shows the forces on a gear of the sliding sleeve;

FIG. 3 is a diagrammatically view on the temporal course of the clutch closing positions.

DETAILED DESCRIPTION OF THE INVENTION

Figure 4:
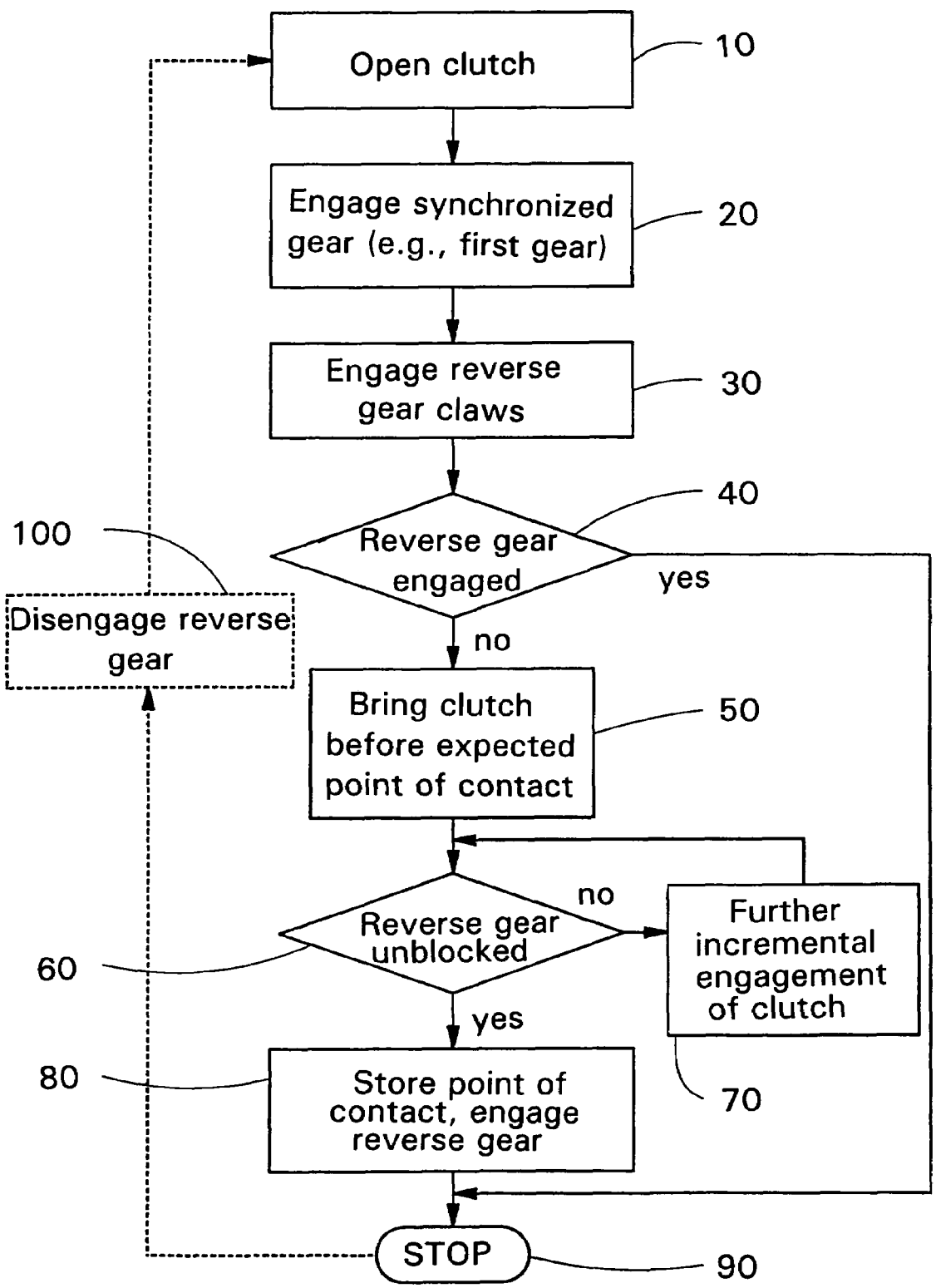
FIG. 4 is a flow chart for implementing the method for contact point determination.

The embodiment of the invention presented here proceeds from the assumption that determining the contact point of the clutch takes place in an automated shifting transmission which does not have a synchronized reverse gear at its disposal. Such a transmission configuration is in no way unusual since precisely in transmissions with automatically running coupling and decoupling processes, the gearshifting processes can run delicately controlled such that it is possible to dispense with the additional manufacturing costs for synchronization devices for the reverse gear.

The transmission-side engagement of a non-synchronized reverse gear usually takes place when transmission output shafts and/or transmission reduction countershafts are standing still in order to avoid a jerky rotational speed adjustment with unpleasant shifting noises between the transmission components participating in the shifting process.

As FIG. 1 shows a reverse gear-toothed wheel pivoted on a drive shaft which is connected torsion-resistant with the transmission using a sliding sleeve 1 in such a transmission-side engagement of the reverse gear, whereby the sliding sleeve 1 is arranged torsion-resistant and axially displaceable on this shaft.

In order to produce a mechanical connection of the reverse gear idler wheel with the sliding sleeve 1, these two transmission components have at their disposal claw-like clutch bodies that engage with one another and can enter into a torsion-resistant connection with one another.

If a non-synchronized reverse gear is to be engaged transmission-side with such transmissions, the sliding sleeve 1 is moved in a direction of the arrow 5 to a clutch body 2 of the reverse gear-toothed wheel with a specific positioning force $F_{Syn}$. Moreover, it is not a rare occasion for the situation to occur that claws 3 of the sliding sleeve 1 and claws 4 of the clutch body 2 of the reverse gear-toothed wheel are found in a tooth-on-tooth position represented in FIG. 1.

The transmission-side engagement of the reverse gear can in such a situation take place in that the clutch, up until then partially opened, is partially closed so that, likewise, a torque is applied to the transmission shaft on which the sliding sleeve 1 and the reverse gear wheel are arranged. Insofar as the adjusting force generated by this torque is greater than a force of friction $F_{Reib}$ on claws 2, 4 lying one upon the other, the claws 3 of the sliding sleeve 1 can be rotated against the claws 2 of the clutch body 4 of the reverse gear-toothed wheel.

As FIG. 2 shows, even a comparatively low clutch torque suffices with a low application force 5 of the sliding sleeve 1 to allow the claws 2, 4 to rotate against one another to dissolve the tooth-on-tooth position and finally to allow the gearing to engage. This engagement process is then established by a suitable sensor and communicated to the control and regulation apparatus.

These connections make it clear that the point of contact of the clutch can be defined as the clutch position in which a large starting torque is transmitted such that it suffices to dissolve the above described tooth-on-tooth position.

Ascertaining the starting torque or ascertaining the point of contact of a clutch can be visually clarified with the aid of FIG. 3. The course over time of the clutch closing position 6 during a point of contact determination is traced in this representation. Here one proceeds from the assumption that the internal combustion engine is running during a transmission-side engagement of the reverse gear and the motor vehicle is at a standstill.

The clutch is opened in a first step and the transmission input shaft and/or countershaft of the transmission is braked up to a standstill by the transmission-side engagement of the synchronized first gear using inherently known synchronizing components. Subsequently, the sliding sleeve 1, allocated to the reverse gear-toothed wheel, is axially displaced on its transmission shaft with little force and applied to the clutch body 2 of the reverse gear-toothed wheel.

Insofar as the sliding sleeve 1 meshes into the shift gearing of the clutch body 2 without a tooth-on-tooth position arising, the process is terminated without determining the contact point of the clutch. If the reverse gear will not engage, due to a tooth-on-tooth position of the claw teeth 3, 4, then the clutch, in accordance with FIG. 3, is closed in a first step to the extent that is specified by a predefined regulating path stored in the control and regulation apparatus.

This closing of the clutch preferably takes place in stages so that sufficient time remains between each additional closing motion of the activation apparatus closing the clutch in order to establish using a suitable sensor whether the transmittable force just adjusted suffices to break the clutch body teeth 3, 4 out of their tooth-on-tooth position. As soon as this starting torque is reached, the clutch body teeth 3, 4 are displaced against one another and the gearing 3 of the sliding sleeve 1 is slid into the gearing 4 of the clutch body 2. The clutch closing position set at this time is then the pursued current contact point of the clutch.

As FIG. 3 makes clear, it can occur in individual cases, owing to the incremental adjustment of the clutch closing path, that a current contact point $A_T$ deviates by a small amount from an established point of contact $A_F$ and a temporal interval $\Delta t$ between the actual and the established cancellation of the tooth-on-tooth position of the clutch body exists. This occasionally occurring error in determining the point of contact is, however, negligibly small in comparison with the accuracy that can be reached with the previously known means.

The process for determining the point of contact of a clutch shown in FIG. 3, as well as in the flow diagram in accordance with FIG. 4, is preferably conducted such that here the reverse gear need not be explicitly selected by the driver or the control and regulation apparatus. Rather the control and regulation apparatus can always conduct such a process for determining the point of contact unnoticed by the driver if the vehicle preferably is at a standstill and the transmission is shifted into the idle or neutral position.

As the flow diagram in FIG. 4 illustrates, the clutch is opened in a first procedural step 10 in order then to engage and subsequently disengage a synchronized gear again in a second procedural step 20 for braking a transmission input shaft or transmission countershaft.

Then a displacement of the reverse gear sliding sleeve 1 on its transmission shaft takes place in a next procedural step 30 until it lies on the clutch body 2 of the reverse gear-toothed wheel or enters into gearing with it.

In a next step 40, it is then examined whether the sliding sleeve 1 is meshed with the reverse gear clutch body 2 and therewith whether the reverse gear is engaged. Insofar as the reverse gear is engaged, the determination of a contact point is broken off (step 90) or, if need be, the clutch is reopened after disengaging the reverse gear by sliding a sliding sleeve back 1 (step 100) and the point of contact determination process is conducted again with step 10.

In contrast the reverse gear is not engaged, if the teeth 3, 4 of the sliding sleeve 1 and the clutch body 2 stand in a tooth-on-tooth position in relation to each other so that in a next step 50, a closing of the clutch up to the predetermined expected point of contact takes place.

To the extent that a test conducted in a procedural step 60 shows with respect to the unblocking of the reverse gear that the reverse gear is not yet engaged, further closing of a clutch (step 70) and a subsequent renewed test of the aforementioned blocked state (procedural step 60) take place.

If the test in the procedural step 60 shows that the sliding sleeve 1 is meshed with the clutch body 2, and therewith that the reverse gear is engaged, the point of contact or the regulating path of the clutch up to the point of contact is stored in the control and regulation apparatus in a procedural step 80. The point of contact determination is subsequently broken off (step 90) or, if need be, the clutch is opened with procedural step 10 after disengagement of the reverse gear by sliding the sliding sleeve 1 back (step 100) and the contact point determination process is conducted again.

These processes for determining the point of contact can take place periodically or aperiodically, whereby periodic contact point determinations are preferably conducted in specified time intervals or after specific travel distances.

Preferably such a point of contact determination process is to be broken off by the control and regulation apparatus when the driver of the motor vehicle or a superior transmission control function request turning on another transmission step.

The method of the invention for determining the point of contact is distinguished in that it manages exclusively with sensor signals, which are obtained in the transmission and on the clutch or its adjusting resources. In this way, there is no dependence upon signal sources external to the transmission, which may be erroneous and whose series tolerances cannot be influenced by the transmission or clutch manufacturer.

Furthermore, the method of the invention does not depend upon ambient temperature or air pressure, whereby these variables exert influence with motor-related measured variables in typical contact point determination methods.

The contact point can, moreover, be very exactly determined with the method of the invention because even a very small clutch torque suffices in connection with a low force of application of the sliding sleeve on the clutch body of the reverse gear wheel to cancel the tooth-on-tooth position. The incremental clutch regulating paths can be very finely graduated so that the accuracy, with which the point of contact is determined, is significantly better than with previously known methods.

REFERENCE NUMBERS 1 sliding sleeve
2 reverse gear clutch body
3 Sliding sleeve tooth
4 clutch body tooth
5 direction of engagement
6 clutch regulation path
10 open clutch
20 engage and subsequently disengage gear synchronized for braking the transmission input shaft or countershaft
30 move reverse gear sliding sleeve until contact on a reverse gear clutch body
40 test whether reverse gear sliding sleeve is meshed with the reverse gear clutch body and therewith whether the reverse gear is engaged
50 close clutch up to the expected point of contact
60 test whether reverse gear sliding sleeve is connected through and reverse gear is engaged
70 move the sliding sleeve further in the direction toward the reverse gear clutch body
80 store point of contact or adjustment path of the clutch
90 stop
100 disengage the reverse gear
$A_F$ stablished point of contact
$A_T$ actual point of contact
t time
$\Delta t$ time segment
$F_{Reib}$ force of friction
$_{Syn}$ force of application of the sliding sleeve
N Driving stage

The invention claimed is:

1. A method for use in an automated shifting transmission of a vehicle with a non-synchronized reverse gear for determining a point of contact during a closing path of a clutch at which the clutch begins to transmit a torque wherein the point of contact is determined as that point in a clutch closing path at which the torque transmitted by the clutch is large enough to displace a tooth (3) of a sliding sleeve (1) against a tooth (4) of a clutch body (2) of a reverse gear-toothed wheel in a tooth-on-tooth position, the method comprising the steps of:
   initiating the method by disengaging the reverse gear and the clutch;
   engaging and subsequently disengaging a synchronized braking of one of a transmission input shaft and a transmission countershaft;
   moving a reverse gear sliding sleeve on a transmission shaft to engage a reverse gear clutch body connected with a reverse gear-toothed wheel;
   testing whether the reverse gear sliding sleeve is meshed with the reverse gear dutch body and whether the reverse gear is engaged;
   when the reverse gear is engaged, terminating the method; and
   when the reverse gear is not engaged, further closing the clutch up to a predetermined point of contact; and
   again testing whether the reverse gear sliding sleeve is meshed with the reverse gear clutch body and whether the reverse gear is engaged; and
   when the reverse gear is not yet engaged, further closing the clutch and again testing whether the reverse gear sliding sleeve is meshed with the reverse gear clutch body and whether the reverse gear is engaged; and
   when the reverse gear is engaged, storing one of the point of contact or a regulating path of the clutch up to the point of contact and terminating the method.

2. The method according to claim 1, further comprising the step of performing the closing of the clutch, when the reverse gear is not yet engaged, in incremental steps.

3. The method according to claim 1, further comprising the step of executing the method when the vehicle is standing still and a drive motor is running.

4. The method according to claim 3, further comprising the step of initiating the method when sensors on one of a transmission selection device and a transmission shifting device communicate to a control and regulation apparatus one of that the transmission should be shifted into one of an idling state and a neutral drive state (N) and that the transmission is currently in the idling state.

5. The method according to claim 1, further comprising the step of executing the method at each reverse gearshifting process.

6. The method according to claim 1 further comprising the step of conducting the method in one of cyclical and acyclical intervals independently of execution of a reverse gearshifting process.

7. The method according to claim 6, further comprising the step of basing the one of a cyclical and acyclical interval on one of time and a travel distance.

8. The method according to claim 1, further, comprising the step of terminating the method upon occurrence a communication of a request for a reduction change process to a control and regulation apparatus by one of a transmission selection device and a transmission shifting device.

9. A method for use in an automated shifting transmission of a vehicle with a non-synchronized reverse gear for determining a point of contact during a closing path of a clutch at which the clutch begins to transmit a torque, the method comprising the steps of:
   disengaging at least one of the reverse gear and the clutch;
   engaging and subsequently disengaging a synchronized braking of at least one of a transmission input shaft or a transmission countershaft;
   actuating a reverse gear sliding sleeve to engage a reverse gear clutch body connected with a reverse gear-toothed wheel; end
   determining when the dutch is data point of contact in a closing path of the clutch at which the clutch begins to transmit a torque by detecting at least one of when the reverse gear sliding sleeve is meshed with the reverse gear clutch body and when the reverse gear is engaged,
   wherein the point of contact in the closing path of the clutch is a point in the closing path of the clutch at which a torque transmitted by the clutch is large enough cause a tooth-on-tooth displacement of the sliding sleeve against a tooth of a clutch body of the reverse gear-toothed wheel,
   when the reverse gear is engaged, terminating the method, and
   when the reverse gear is not engaged, repeatedly incrementally engaging the clutch until at least one of the reverse gear sliding sleeve is meshed with the reverse gear clutch body and the reverse gear Is engaged, and storing at least one of the point of contact and the regulating path taken by the clutch up to the point of contact for subsequent use in engaging the clutch in a subsequent clutch operation, and terminating the method.

10. The method according to claim 9, the method is executed when the vehicle is standing still and a drive motor is running.

11. The method according to claim 10, wherein the method is initiated when sensors on one of a transmission selection device and a transmission shifting device indicate to a control and regulation apparatus that the transmission is to be shifted into one of idling state and a neutral drive state (N) and that the transmission is currently in the idling state.

12. The method according to claim 9, further comprising the step of initiating the method at each reverse gearshifting process.

13. The method according to claim 9, further comprising the step of initiating the method in one of a cyclical interval and an acyclical interval independendy of execution of a reverse gearshifting process.

14. The method according to claim 13, further comprising the step of basing one of a cyclical interval and an acyclical interval on one of a time interval and a travel distance.

15. The method according to 9, further comprising the step of terminating execution of the method upon a request for a reduction change process.

16. A method of an automated shifting transmission having a non-synchronized reverse gear for determining a point of contact, during a clutch engagement path, at which the clutch begins to transmit a torque, the method comprising the steps of:

disengaging at least one of the reverse gear and the clutch;

engaging and subsequently disengaging a synchronized braking of at least one of a transmission input shaft or a transmission countershaft;

actuating a reverse gear sliding sleeve to engage a reverse gear clutch body connected with a reverse gear-toothed wheel; and determining when the clutch is at a point of contact, while traveling along the clutch engagement path, at which the clutch begins to transmit a torque by detecting at least one of when the reverse gear sliding sleeve meshes with the reverse gear clutch body and when the reverse gear is engaged, in which the point of contact is a point along the clutch engagement path at which torque transmitted by the clutch is sufficient to cause a tooth-on-tooth displacement of the sliding sleeve against a tooth of a clutch body of the reverse gear-toothed wheel;

terminating the method upon engaging the reverse gear and if the reverse gear is not engaged, repeatedly incrementally engaging the clutch until at least one of the reverse gear sliding sleeve meshes with the reverse gear clutch body and the reverse gear is engaged, and storing at least one of the point of contact and the regulating path taken by the clutch up to the point of contact for subsequent use in engaging the clutch in a subsequent dutch operation, and terminating the method.

* * * * *